United States Patent
Paluri et al.

(10) Patent No.: US 12,542,906 B2
(45) Date of Patent: Feb. 3, 2026

(54) METHOD AND DEVICE FOR IMAGE CODING BASED ON DECODER-SIDE MOTION VECTOR REFINEMENT

(71) Applicant: LG Electronics Inc., Seoul (KR)

(72) Inventors: Seethal Paluri, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/695,225

(22) PCT Filed: Sep. 30, 2022

(86) PCT No.: PCT/KR2022/014767
§ 371 (c)(1),
(2) Date: Mar. 25, 2024

(87) PCT Pub. No.: WO2023/055176
PCT Pub. Date: Apr. 6, 2023

(65) Prior Publication Data
US 2024/0406403 A1 Dec. 5, 2024

Related U.S. Application Data

(60) Provisional application No. 63/251,042, filed on Oct. 1, 2021, provisional application No. 63/251,040, filed on Oct. 1, 2021.

(51) Int. Cl.
*H04N 19/132* (2014.01)
*H04N 19/137* (2014.01)
*H04N 19/176* (2014.01)

(52) U.S. Cl.
CPC ......... *H04N 19/137* (2014.11); *H04N 19/132* (2014.11); *H04N 19/176* (2014.11)

(58) Field of Classification Search
CPC .. H04N 19/119; H04N 19/132; H04N 19/137; H04N 19/176; H04N 19/44;
(Continued)

(56) References Cited

U.S. PATENT DOCUMENTS

2019/0132606 A1 5/2019 Su et al.
2020/0128258 A1* 4/2020 Chen ................... H04N 19/139
(Continued)

FOREIGN PATENT DOCUMENTS

KR 10-2020-0078609 7/2020
KR 10-2021-0111859 9/2021

OTHER PUBLICATIONS

International Search Report and Written Opinion in Appln. No. PCT/KR2022/014767, mailed on Jan. 6, 2023, 8 pages (with English translation).
(Continued)

*Primary Examiner* — Md N Haque
(74) *Attorney, Agent, or Firm* — Fish & Richardson P.C.

(57) ABSTRACT

An image decoding method performed by a decoding device is provided. The method comprises the steps of: deriving a motion vector of a current block; deriving a refined motion vector regarding the current block by applying decoder-side motion vector refinement (DMVR) to the motion vector; deriving prediction samples regarding the current block on the basis of the refined motion vector; and generating reconstruction samples regarding the current block on the basis of the prediction samples, wherein the refined motion vector is derived on the basis of a search end condition of the decoder-side motion vector refinement.

14 Claims, 11 Drawing Sheets

(58) Field of Classification Search
CPC .... H04N 19/513; H04N 19/52; H04N 19/521; H04N 19/557; H04N 19/56; H04N 19/70
See application file for complete search history.

(56) References Cited

U.S. PATENT DOCUMENTS

| | | | |
|---|---|---|---|
| 2020/0304827 A1* | 9/2020 | Abe | H04N 19/573 |
| 2021/0266594 A1* | 8/2021 | Luo | H04N 19/159 |
| 2021/0385481 A1* | 12/2021 | Liu | H04N 19/105 |

OTHER PUBLICATIONS

Qualcomm Incorporated, "EE2: Tests of compression efficiency methods beyond VVC," Joint Video Experts Team (JVET) of ITU-T SG 16 WP 3 and ISO/IEC JTC 1/SC 29, Document: JVET-V0120-v2, 22nd Meeting, by teleconference, Apr. 20-28, 2021, 30 pages.
Coban et al., "Algorithm description of Enhanced Compression Model 2 (ECM 2)," JVET-W2025, Joint Video Experts Team (JVET) of ITU-T SG 16 WP 3 and 1S0/IEC JTC 1/SC 29, 23rd Meeting, by teleconference, Jul. 7-16, 2021, 22 pages.
Extended European Search Report in European Appln. No. 22876948.5, mailed on Sep. 10, 2025, 10 pages.

* cited by examiner

METHOD AND DEVICE FOR IMAGE CODING BASED ON DECODER-SIDE MOTION VECTOR REFINEMENT

CROSS-REFERENCE TO RELATED APPLICATIONS

This application is a National Stage application under 35 U.S.C. § 371 of International Application No. PCT/KR2022/014767, filed on Sep. 30, 2022, which claims the benefit of U.S. Provisional Application No. 63/251,040, filed on Oct. 1, 2021, and U.S. Provisional Application No. 63/251,042, filed on Oct. 1, 2021. The disclosures of the prior applications are incorporated by reference in their entirety.

TECHNICAL FIELD

The present disclosure relates to video or image coding technology, and for example, image coding technology based on decoder-side motion vector refinement.

BACKGROUND

Recently, the demand for high resolution, high quality image/video such as 4K, 8K or more Ultra High Definition (UHD) video/image is increasing in various fields. As the video/image resolution or quality becomes higher, relatively more amount of information or bits are transmitted than for conventional video/image data. Therefore, if video/image data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual video/image, such as game images/videos, are also growing.

Therefore, a highly efficient image compression technique is required to effectively compress and transmit, store, or play high resolution, high quality video/image showing various characteristics as described above.

SUMMARY

The technical problem of the present disclosure is to provide a method and an apparatus for improving video/image coding efficiency.

Another technical problem of the present disclosure is to provide an image coding method and apparatus based on decoder side motion vector refinement to increase inter coding efficiency.

According to an embodiment of the present disclosure, an image decoding method performed by a decoding apparatus is provided. The method includes deriving a motion vector of a current block, deriving a refined motion vector for the current block by applying decoder side motion vector refinement (DMVR) to the motion vector, deriving prediction samples for the current block based on the refined motion vector, and generating reconstructed samples for the current block based on the prediction samples, wherein the refined motion vector is derived based on a search termination condition for the decoder side motion vector refinement.

According to another embodiment of the present disclosure, an image encoding method performed by an encoding apparatus is provided. The method includes deriving a motion vector of a current block, deriving a refined motion vector for the current block by applying decoder side motion vector refinement (DMVR) to the motion vector, deriving prediction samples for the current block based on the refined motion vector, deriving residual samples based on the prediction samples, and generating a bitstream by encoding image information including information on the residual samples, wherein the refined motion vector is derived based on a search termination condition for the decoder side motion vector refinement.

According to another embodiment of the present disclosure, a computer-readable digital storage medium storing a bitstream and/or encoded video/image information generated according to the video/image encoding method disclosed in at least one of the embodiments of the present disclosure is provided.

According to another embodiment of the present disclosure, a transmission method for data comprising a bitstream of image information is provided. The transmission method includes obtaining the bitstream of the image information, wherein the bitstream is generated based on deriving a motion vector of a current block, deriving a refined motion vector for the current block by applying decoder side motion vector refinement (DMVR) to the motion vector, deriving prediction samples for the current block based on the refined motion vector, deriving residual samples based on the prediction samples, and generating a bitstream by encoding image information including information on the residual samples, and transmitting the data comprising the bitstream, wherein the refined motion vector is derived based on a search termination condition for the decoder side motion vector refinement.

The present disclosure can have various effects. For example, according to the present disclosure, overall image/video compression efficiency can be improved. In addition, according to the present disclosure, efficient image coding based on decoder side motion vector refinement can be performed. In addition, according to the present disclosure, it is possible to provide a decoder side motion vector refinement method that can improve the performance of the inter-coding structure and not increase processing complexity. In addition, according to the present disclosure, effective inter prediction can be performed by providing various early termination methods for decoder side motion vector refinement. In addition, according to the present disclosure, a decoder side motion vector refinement method using variable granularity can be provided, which can increase flexibility without increasing processing complexity.

The effects that can be achieved through specific embodiments of the present disclosure are not limited to the effects listed above. For example, there may be various technical effects that a person having ordinary skill in the related art can understand or derive from the present disclosure. Accordingly, the specific effects of the present disclosure are not limited to those explicitly described in the present disclosure, and may include various effects that can be understood or derived from the technical features of the present disclosure.

DETAILED DESCRIPTION

Figure 1:
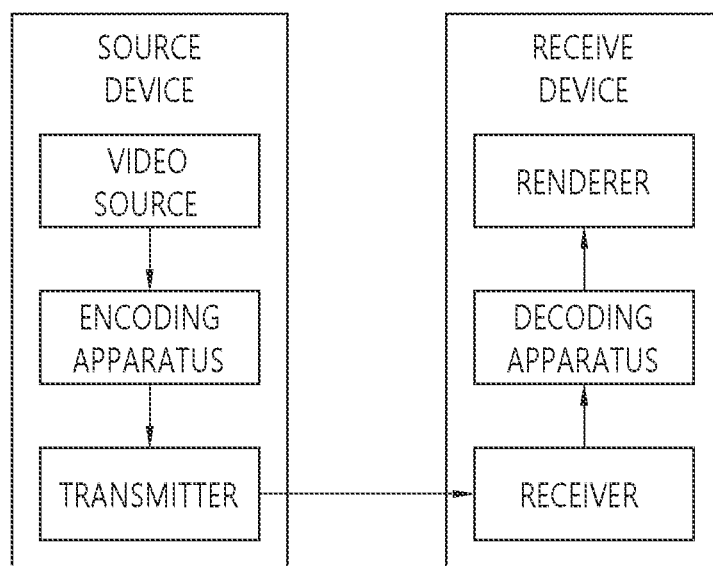
FIG. 1 schematically illustrates an example of a video/image coding system to which the embodiments of the present document may be applied.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

In the present disclosure, "A or B" may mean "only A". "only B" or "both A and B". In other words, in the present disclosure, "A or B" may be interpreted as "A and/or B". For example, in the present disclosure. "A. B or C" may mean "only A". "only B", "only C", or "any combination of A. B and C".

A slash (/) or a comma used in the present disclosure may mean "and/or". For example, "A/B" may mean "A and/or B". Accordingly, "A/B" may mean "only A", "only B", or "both A and B". For example, "A, B. C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A. B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "prediction (intra prediction)" is indicated, "intra prediction" may be proposed as an example of "prediction". In other words. "prediction" in the present disclosure may be not limited to "intra prediction", and "intra prediction" may be proposed as an example of "prediction". Also, even when "prediction (i.e., intra prediction)" is indicated, "intra prediction" may be proposed as an example of "prediction".

The present disclosure relates to video/image coding. For example, the methods/embodiments disclosed in the present disclosure may be applied to the method disclosed in a versatile video coding (VVC) standard. Further, the methods/exemplary embodiments disclosed in the present disclosure are applicable to a method disclosed in an essential video coding (EVC) standard, an AOMedia Video 1 (AV1) standard, a 2nd generation of audio video coding (AVS2) standard, or a next-generation video/image coding standard (e.g., H.267 or H.268, etc.).

The present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. Also, a subpicture may represent a rectangular region of one or more slices within a picture. That is, a subpicture may contain one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

Technical features that are individually described in one drawing in the present disclosure may be implemented individually or may be implemented at the same time.

The following drawings were created to explain a specific example of the present disclosure. Since the names of specific devices described in the drawings or the names of specific signals/messages/fields are presented as an example, the technical features of the present disclosure are not limited to the specific names used in the following drawings.

Hereinafter, embodiments of the present disclosure will be described in detail with reference to the accompanying drawings. In addition, like reference numerals may be used to indicate like elements throughout the drawings, and the same descriptions on the like elements will be omitted.

FIG. 1 schematically illustrates an example of a video/image coding system to which the embodiments of the present document may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD. SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
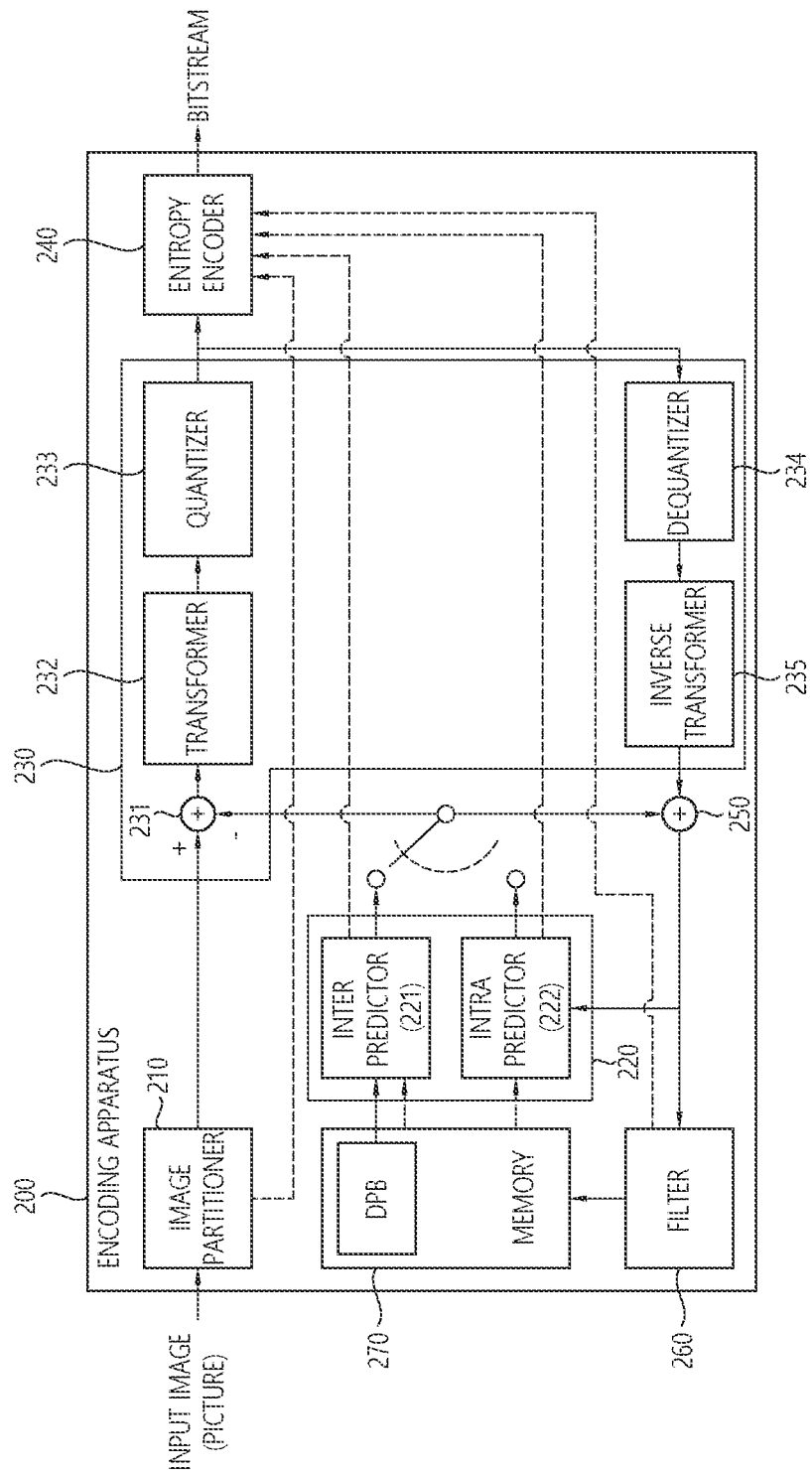
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
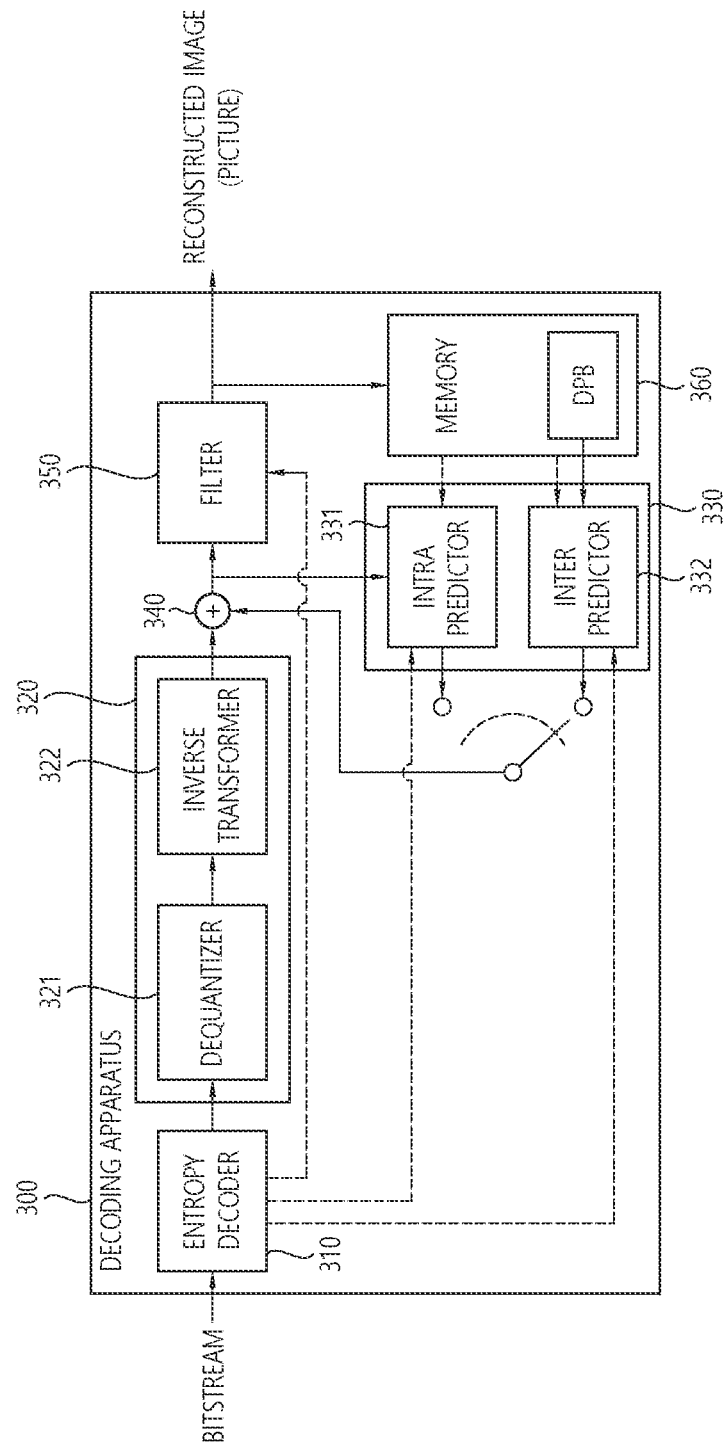
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, a memory 360. The predictor 330 may include an intra predictor 331 and an inter predictor 332. The residual processor 320 may include a dequantizer 321 and an inverse transformer 322. The entropy decoder 310, the residual processor 320, the predictor 330, the adder 340, and the filter 350 may be configured by a hardware component (e.g., A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP) In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Figure 4:
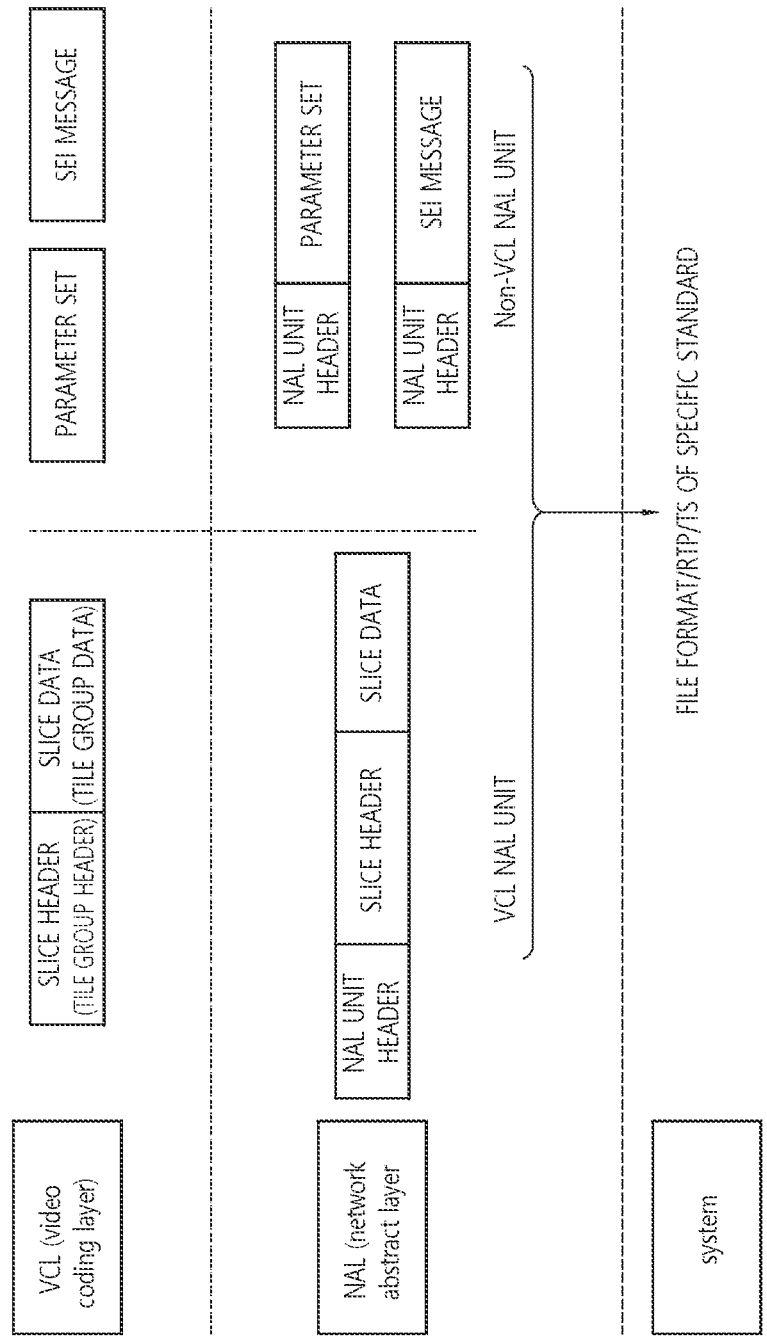
FIG. 4 exemplarily illustrates a layer structure for a coded video/image.

FIG. 4 exemplarily illustrates a layer structure for a coded video/image.

Referring to FIG. 4, a coded video/image may be divided into a video coding layer (VCL) that performs decoding processing of a video/image and handles the decoding processing, a lower system that transmits and stores coded information, and a network abstraction layer (NAL) which exists between the VCL and the lower system, and serves to perform a network adaptation function.

For example, VCL data including compressed image data (slice data), or a picture parameter set (PPS), a sequence parameter set (SPS), or a video parameter set (VPS), or a parameter set including a supplemental enhancement information (SEI) message additionally required in an image decoding process may be generated, in the VCL.

For example, in the NAL, header information (NAL unit data) is added to a raw byte sequence payload (RSRP) generated in the VCL to generate the NAL unit. In this case, the slice data, the parameter set, the SEI message, etc., generated in the VCL may be referred to, for the RBSP. The NAL unit header may include NAL unit type information specified according to RSRP data included in the corresponding NAL unit.

For example, as illustrated in FIG. 4, the NAL unit may be classified into a VCL NAL unit and a non-VCL NAL unit according to the RSRP generated in the VCL. The VCL NAL unit may mean a NAL unit including information (slice data) on the information, and the non-VCL NAL unit may mean a NAL unit including information (parameter set or SEI message) required to decode the image.

The VCL NA unit and the non-VCL NAL unit may be transmitted through a network while header information is added according to a data standard of a sub system. For example, the NAL unit may be converted into a data format of a predetermined standard such as an H.266/VVC file format, a real-time transport protocol (RTP), a transport stream (TS), etc., and transported through various networks.

Further, as described above, in respect to the NAL unit, a NAL unit type may be specified according to an RBSP data structure included in the corresponding NAL unit, and information on the NAL unit type may be stored in a NAL unit header and signaled.

For example, the NAL unit may be classified into a VCL NAL unit type and a non-VCL NAL unit type according to whether the NAL unit includes information (slice data) on the image. Further, the VCL NAL unit type may be classified according to a property and a type of picture included in the VCL NAL unit and the non-VCL NAL unit may be classified according to the type of parameter set.

The following is an example of the NAL unit type specified according to the type of parameter set included in the non-VCL NAL unit type.

Adaptation Parameter Set (APS) NAL unit: Type for the NAL unit including the APS Decoding Parameter Set (DPS) NAL unit: Type for the NAL unit including the DPS Video Parameter Set (VPS) NAL unit: Type for the NAL unit including the VPS Sequence Parameter Set (SPS) NAL unit: Type for the NAL unit including the SPS Picture Parameter Set (PPS) NAL unit: Type for the NAL unit including the PPS Picture header (PH) NAL unit: Type for the NAL unit including the PH The above-described NAL unit types may have syntax information for the NAL unit type and the syntax information may be stored in the NAL unit header and signaled. For example, the syntax information may be nal_unit_type and the NAL unit type may be specified as a value of nal_unit_type.

Meanwhile, one picture may include a plurality of slices, and the slice may include a slice header and slice data. In this case, one picture header may be added for the plurality of slices (a set of the slice header and the slice data). The picture header (picture header syntax) may include information/parameters which may be commonly applied to a picture. The slice header (slice header syntax) may include information/parameters which may be commonly applied to a slice. APS (ASP syntax) or PPS (PPS syntax) may include information/parameters which may be commonly applied to one or more slices or pictures. SPS (SPS syntax) may include information/parameters which may be commonly applied to one or more sequences. VPS (VPS syntax) may include information/parameters which may be commonly applied to a plurality of layers. DPS (DPS syntax) may include information/parameters which may be commonly applied to an overall image. The DPS may include information/parameter related to concatenation of a coded video sequence (CVS).

In the present disclosure, the image/video information encoded from the encoding apparatus to the decoding apparatus and signaled in the form of the bitstream may include intra-picture partitioning related information, intra/inter prediction information, interlayer prediction related information, residual information, and in-loop filtering information, and may include information included in the APS, information included in the PPS, information included in the SPS, information included in the VPS, and/or information included in the DPS. Further, the image/video information may further include information of the NAL unit header.

Meanwhile, as described above, in performing video coding, prediction is performed to increase compression efficiency. A predicted block including prediction samples for the current block, that is, the coding target block, may be generated through the prediction, Here, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). Here, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present disclosure, at least one of the quantization/the dequantization and/or the transform/the inverse transform may be omitted. If the quantization/dequantization is omitted, the quantized transform coefficient may be referred to as a transform coefficient. If the transform/the inverse transform are omitted, the transform coefficient may also be referred to as a coefficient or a residual coefficient, or for unity of expression, also be still referred to as the transform coefficient. In addition, whether or not the transform/inverse transform is omitted may be signaled based on transform_skip_flag.

In the present disclosure, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present disclosure.

Meanwhile, as described above, the intra prediction or inter prediction may be applied when performing the prediction on the current block. Hereinafter, a case of applying the inter prediction to the current block will be described.

The predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, B1 prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, B1 prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction, Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Further, various inter prediction modes may be used in applying the inter prediction to the current block. For example, various modes including a merge mode, a skip mode, a motion vector prediction (MVP) mode, an affine mode, a historical motion vector prediction (HMVP) mode, and the like may be used. A decoder side motion vector refinement (DMVR) mode, an adaptive motion vector resolution (AMVR) mode, a bi-directional optical flow (BDOF) etc., may be further used as an ancillary mode. The affine mode may be referred to as an affine motion prediction mode. The MVP mode may be referred to as an advanced motion vector prediction (AMVP) mode. In this document, some modes and/or motion information candidates derived by some modes may be included in one of motion information related candidates of other modes.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

Further, the motion information of the current block may be used in applying the inter prediction to the current block. The encoding apparatus may derive optimal motion information for the current block through a motion estimation procedure. For example, the encoding apparatus may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding apparatus according to various methods based on the inter prediction mode.

A predicted block for the current block may be derived based on the motion information derived according to the inter prediction mode. The predicted block may include prediction samples (prediction sample array) of the current block. When the motion vector (MV) of the current block indicates a fractional sample unit, an interpolation procedure may be performed and the prediction samples of the current block may be derived based on reference samples of the fractional sample unit in the reference picture through the interpolation procedure. When the affine inter prediction is applied to the current block, the prediction samples may be generated based on a sample/subblock-unit MV. When the bi-prediction is applied, prediction samples derived through a weighted sum or a weighted average (according to a phase) of prediction samples derived based on the L0 prediction (i.e., a prediction using a reference picture in the reference picture list L0 and MVL0) and prediction samples derived based on the L1 prediction (i.e., a prediction using a reference picture in the reference picture list L1 and MVL1) may be used as the prediction samples of the current block. When the bi-prediction is applied, if the reference picture used for the L0 prediction and the reference picture used for the L1 prediction are located in different temporal directions based on the current picture (i.e., if the prediction corresponds to the bi-prediction and the bi-directional prediction), this may be referred to as a true bi-prediction.

Reconstructed samples and reconstructed pictures may be generated based on the derived prediction samples and thereafter, the procedure such as in-loop filtering, etc., may be performed as described above.

Meanwhile, since the motion of the current block is predicted based on the motion vector of the neighboring block without a motion vector difference (MVD) in the skip mode and/or the merge mode, the skip mode and/or the merge mode shows a limitation in a motion prediction. In order to improve the limitation of the skip mode and/or the merge mode, the motion vector may be refined by applying a Decoder-side Motion Vector Refinement (DMVR) mode, a Bi-directional optical flow (BDOF) mode, etc. The DMVR and BDOF modes may be used when the true bi-prediction is applied to the current block.

Figure 5:
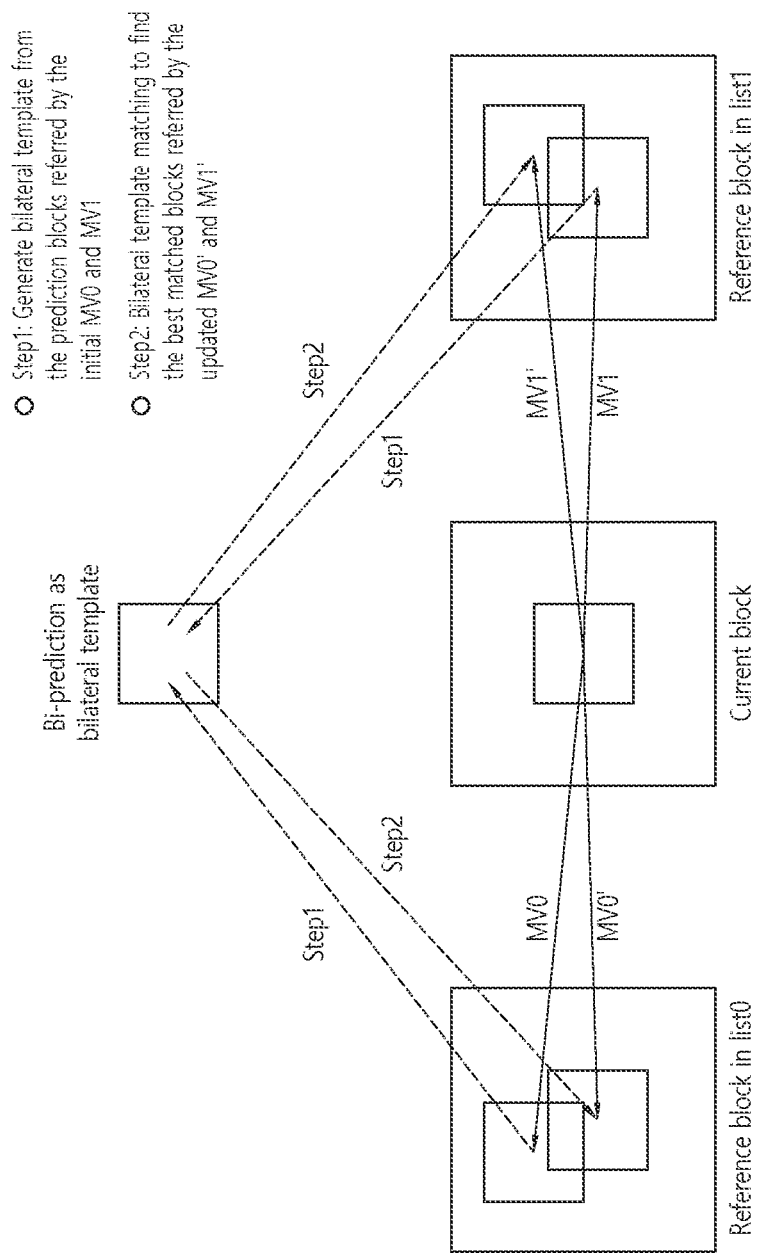
FIG. 5 is a diagram for describing an embodiment of a process of performing a Decoder-side Motion Vector Refinement (DMVR).

FIG. 5 is a diagram for describing an embodiment of a process of performing a Decoder-side Motion Vector Refinement (DMVR).

The DMVR is a method in which the decoder performs the motion prediction by refining the motion information of the neighboring block. When the DMVR is applied, the decoder may derive the refined motion information through cost comparison based on a template generated by using the motion information of the neighboring block in the merge/skip mode. In this case, precision of the motion prediction may be increased and compression performance may be enhanced without additional signaling information.

In this disclosure, for convenience of description, the decoding apparatus is mainly described, but the DMVR according to the embodiment of this disclosure may be performed in the same method even in the encoding apparatus.

Referring to FIG. 5, the decoding apparatus may derive prediction blocks (i.e., reference blocks) identified by list0 and list1-direction initial motion vectors (or motion information) (e.g., MV0 and MV1) and generate a template (or a bilateral template) by a weighted sum (e.g., averaging) of the derived prediction samples (step 1). Here, the initial motion vectors (MV0 and MV1) may represent motion vectors derived by using the motion information of the neighboring block in the merge/skip mode.

In addition, the decoding apparatus may derive motion vectors (e.g., MV0' and MV1') for minimizing a difference between the template and the sample area of the reference picture through a template matching operation (step 2). Here, the sample area may indicate a neighboring area of an initial prediction block in the reference picture and the sample area may be referred to as the neighboring area, a reference area, a search area, a search range, a search space, etc. The template matching operation may include an operation of calculating a cost measurement value between the template and the sample area of the reference picture. For example, the sum of absolute differences (SAD) may be used for the cost measurement. As one example, as a cost function, the normalized SAD may be used. In this case, matching cost may be given as SAD(T−mean(T), 2*P[x]− 2*mean(P[x])). Here, T represents the template and P[x] represents the block in the search area. In addition, a motion vector for calculating minimum template cost for each of two reference pictures may be considered as an updated motion vector (replacing the initial motion vector). As illustrated in FIG. 5, the decoding apparatus may generate a final bilateral prediction result (i.e. a final bilateral prediction block) by using the updated motion vectors MV0' and MV1'. As an embodiment, multi-iteration for deriving the updated (or new) motion vector may be used for acquiring the final bilateral prediction result.

In an embodiment, the decoding apparatus may call a DMVR process in order to enhance accuracy of an initial motion compensation prediction (i.e., the motion compensation prediction through the conventional merge/skip mode) For example, the decoding apparatus may perform the DMVR process when the prediction mode of the current block is the merge mode or the skip mode and the bilateral bi-prediction in which the bilateral reference pictures are located at opposite directions based on the current picture in a display order is applied to the current block.

Figure 6:
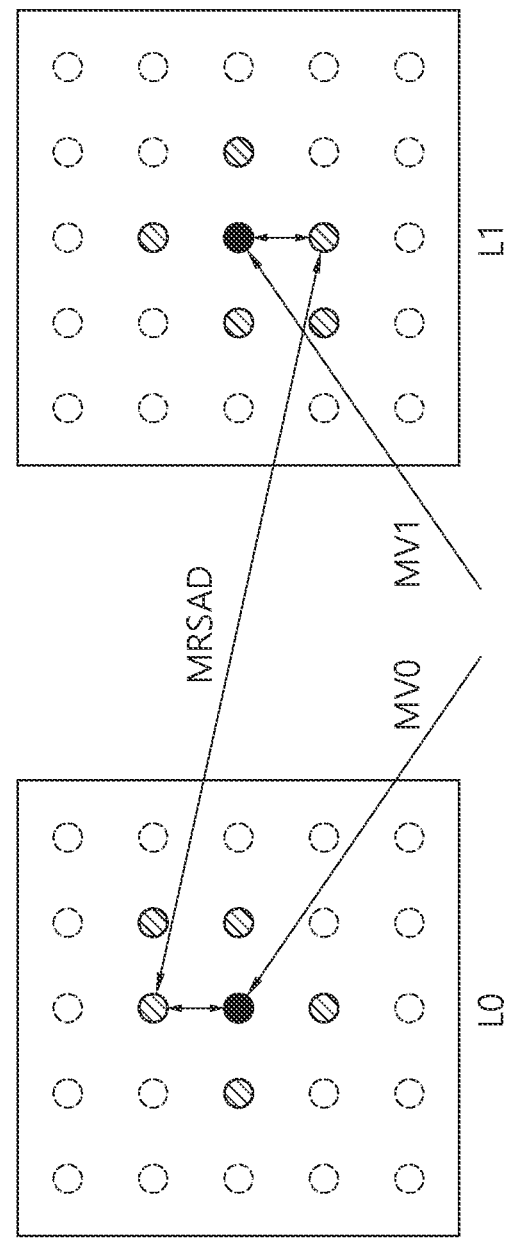
FIG. 6 is a diagram for describing an embodiment of a process of performing a decoder-side motion vector refinement (DMVR) by using a sum of absolute differences (SAD).

FIG. 6 is a diagram for describing an embodiment of a process of performing a decoder-side motion vector refinement (DMVR) by using a sum of absolute differences (SAD).

As described above, the decoding apparatus may measure matching cost by using the SAD in performing the DMVR. As an embodiment, in FIG. 6, a method for refining the motion vector by calculating a mean sum of absolute difference (MRSAD) between the prediction samples in two reference pictures without generating the template will be described. In other words, the method of FIG. 6 shows an embodiment of bilateral matching using the MRSAD.

Referring to FIG. 6, the decoding apparatus may derive an adjacent pixel of a pixel (sample) indicated by the list0 (L0) direction motion vector MV0 on the L0 reference picture and derive an adjacent pixel of a pixel (sample) indicated by the list1 (L1) direction motion vector MV1 on the L1 reference picture. In addition, the decoding apparatus may measure the matching cost by calculating the MRSAD between the L0 prediction block (i.e., L0 reference block) identified by the motion vector indicating the adjacent pixel derived on the L0 reference picture and the L1 prediction block (i.e., L1 reference block) identified by the motion vector indicating the adjacent pixel derived on the L1 reference picture. In this case, the decoding apparatus may select a search point (i.e., a search area having the minimum SAD between the L0 prediction block and the L1 prediction block) having minimum cost as a refined motion vector pair. In other words, the refined motion vector pair may include a refined L0 motion vector indicating a pixel position (L0 prediction block) having the minimum cost in the L0 reference picture and a refined L1 motion vector indicating a pixel position (L1 prediction block) having the minimum cost in the L1 reference picture.

As an embodiment, in calculating the matching cost, after the search area of the reference picture is set, a unilateral prediction may be performed by using a regular 8 tap DCTIF interpolation filter. Further, as one example, 16-bit precision may be used for calculation of the MRSAD and clipping and/or rounding operations may not be applied before the calculation of the MRSAD by considering an internal buffer.

When the true bi-prediction is applied to the current block as described above, the BDOF may be used in order to refine a bi-prediction signal. When the bi-prediction is applied to the current block, the bi-directional optical flow (BDOF) may be used to calculate improved motion information and generate the prediction samples based on the calculated motion information. For example, the BDOF may be applied at a 4×4 subblock level. In other words, the BDOF may be performed in units of 4×4 subblocks in the current block. Alternatively, the BDOF may be applied only to a luma component. Alternatively, the BDOF may be applied only to a chroma component and applied to the luma component and the chroma component.

The BDOF mode is based on an optical flow concept assuming that an object motion is smooth as indicated by a name of the BDOF mode. A motion refinement ($v_x$, $v_y$) may be calculated by minimizing a difference value between the L0 and L1 prediction samples for each of 4×4 subblocks. In addition, the motion refinement may be used for adjusting the bi-prediction sample values in 4×4 subblocks.

It can be seen that the DMVR and the BDOF are techniques that perform the prediction by refining the motion information when applying the true bi-prediction (in this case, the true bi-prediction represents a case of performing the motion prediction/compensation in a reference picture of a different direction based on the picture of the current block), and are a refinement technique with a similar concept in that it is assumed that the motion of an object in the picture is made at a predetermined speed and in a predetermined direction.

Meanwhile, the following describes structures and features that may be used to determine/parse inter mode(s) and/or inter prediction(s) in the decoder in order to improve the performance of the inter coding structure. The described method(s) are based on Versatile Video Coding (VVC), but may also be applied to other past or future video coding technologies.

In this document, multi-pass DMVR technology may be applied to improve inter coding performance. The multi-pass DMVR (i.e., MDMVR) is a technology to further improve (and simplify) the technology of DMVR in next-generation video codecs. In the first pass, bilateral matching (BM) may be applied to a coding block, and in the second pass, BM may be applied to each 16×16 subblock in the coding block, and in the third pass. BDOF may be applied to refine the MV of each 8×8 subblock. Here, the refined MV may be stored for spatial and temporal motion vector prediction.

Referring more specifically to multi-pass DMVR, in the first pass of MDMVR, a refined MV may be derived by applying BM (bilateral matching) to the coding block. Similar to Decoder-Side Motion Vector Refinement (DMVR), in bi-prediction operation, the refined MV may be searched around the two initial MVs (MV0 and MV1) in the reference picture lists L0 and L1. The refined MVs (MV0_pass1 and MV1_pass1) may be derived around the initial MVs based on the minimum bilateral matching cost between two reference blocks in L0 and L1.

The BM may perform a local search to derive integer sample precision intDeltaMV. The local search may apply a 3×3 square search pattern to loop through the search range [−sHor, sHor] in horizontal direction and [−sVer, sVer] in vertical direction. Here, the values of sHor and sVer are determined by the block dimension, and the maximum value of sHor and sVer may be 8.

The bilateral matching cost may be calculated as bilCost=mvDistanceCost+sadCost. When the block size chW*cbH is greater than 64, the MRSAD cost function may be applied to remove the DC distortion effect between reference blocks. When the bilCost at the center point of the 3×3 search pattern has the minimum cost, the intDeltaMV local search may be terminated. Otherwise, the current minimum cost search point becomes the new center point of the 3×3 search pattern and search for the minimum cost may continue, until it reaches the end of the search range.

The existing fractional sample refinement may be further applied to derive the final deltaMV. The refined MVs after the first pass may be derived as follows.
MV0_pass1=MV0+deltaMV
MV1_pass1=MV1−deltaMV In the second pass of MDMVR, a refined MV may be derived by applying BM to a 16×16 grid subblock. For each subblock, a refined MV may be searched around the two MVs (MV0_pass1, MV1_pass1) obtained in the first pass in the reference picture lists L0 and L1. The refined MVs (MV0_pass2(sbIdx2) and MV1_pass2(sbIdx2)) may be derived based on the minimum bilateral matching cost between two reference subblocks in L0 and L1.

For each subblock. BM may perform a full search to derive integer sample precision intDeltaMV. The full search has a search range of [−sHor, sHor] in the horizontal direction and a search range of [−sVer, sVer] in the vertical direction, wherein the values of sHor and sVer are determined by the block dimension, and the maximum value of sHor and sVer may be 8.

The bilateral matching cost may be calculated by applying a cost factor to the SATD cost between two reference subblocks, such as bilCost=satdCost*costFactor. The search area (2*sHor+1)*(2*sVer+1) may be divided into up to 5 diamond-shaped search regions. Each search region is assigned a costFactor, which is determined by the distance (intDeltaMV) between each search point and the starting MV, and each diamond region may be processed in order starting from the center of the search area. In each region, search points may be processed in raster scan order starting from the top left going to the bottom right corner of the region. When the minimum bilCost within the current search region is less than a threshold equal to sbW*sbH, the int-pel full search may be terminated, otherwise the int-pel full search may continue to the next search region until all search points have been examined.

In existing VVC, DMVR fractional sample refinement may be further applied to derive the final deltaMV (sbIdx2). The refined MVs at the second pass can be derived as follows.
MV0_pass2(sbIdx2)=MV0_pass1+deltaMV(sbIdx2)
MV1_pass2(sbIdx2)=MV1_pass1−deltaMV(sbIdx2)

In the third pass of MDMVR, a refined MV may be derived by applying BDOF to an 8×8 grid subblock. For each 8×8 subblock, BDOF refinement may be applied to derive the scaled Vx and Vy without clipping, starting from the refined MV of the parent subblock in the second pass. The derived bioMy(Vx, Vy) may be rounded to 1/16 sample precision and clipped between −32 and 32.

The refined MVs (MV0_pass3 (sbIdx3) and MV1_pass3 (sbIdx3)) at the third pass may be derived as follows.
MV0_pass3(sbIdx3)=MV0_pass2(sbIdx2)+bioMy
MV1_pass3(sbIdx3)=MV0_pass2(sbIdx2)−bioMy Meanwhile, in the current VVC, DMVR is applied to blocks where the width is greater than or equal to 8 and the height is greater than or equal to 8 and the product of the width and the height is greater than or equal to 128. Therefore, DMVR is not applied (i.e., disabled) for a 4×4, N×M block such that N*M<=128. In addition, as described above, in the existing MDMVR, in the first pass, BM (bilateral matching) is applied to the coding block, and in the second pass, BM is applied to each 16×16 subblock within the coding block, and in the third pass, BDOF is applied to refine the MV of each 8×8 subblock.

That is, according to existing video coding technology, there may be cases where DMVR and/or MDMVR are not enabled for a block with small size, such as a 4×4, N×M block where N*M<=128.

Accordingly, the present disclosure proposes an early termination method for DMVR/MDMVR that improves the performance of the inter coding structure and does not increase the processing complexity when applying Decoder-Side Motion Vector Derivation (DMVD) (i.e., DMVR and/or multi-pass DMVR) as described above. For this purpose, the following aspects may be considered. That is, the proposed early termination method for DMVR/MDMVR may include the following embodiments, and the proposed embodiments may be applied individually or in combination.

1. As an example, it may be possible to incorporate simplifications into the current version of DMVR such that it may be possible to use smaller block sizes without increasing the complexity of the processing. One such possibility is that the search range which is currently 2 in VVC, could be reduced to 1. In other words, it may be integrated into the current version of DMVR so that DMVR/MDMVR may be applied to a block size smaller than the block size that satisfies the application conditions of the current DMVR (e.g., 4×4 size. N×M size such as N*M<=128, etc.).

2. In addition, as an example, currently, if the minimum SAD is at the center of the search space, that is, the current initial motion vector, the search may be terminated early. It may be possible to hasten this search by adding additional criteria, such that if the SAD is smaller than a threshold T or within a range of thresholds that are empirically determined, the DMVR search may be terminated.

a. For example, these thresholds may be determined beforehand (offline) by gathering and analyzing relevant block statistics. For example, for a given 4×4 block, considerations of the available neighboring blocks, which mode are they coded in, typical luma intensities for each row/column, etc. may be considered in determining thresholds.

3. In addition, as an example, several conditions may be applied either individually or in combination to achieve early termination. These conditions may include but are not limited to:

a. For example, the distance of the motion vector (i.e., MV) at each iteration step. For example, if the difference between the MV from the refined MV and the current MV is less than a threshold T (i.e., ¼ pel, half-pel etc.)

b. Alternatively, if the MV remains unchanged after one iteration, i.e., if the current point is the best point, then it may be possible to exit the optimization.

c. When multi-level DMVR is used, it may be possible to define exit conditions after each level. For instance, it may be possible to check after each level, if the refined MV meets certain criteria (for example, pel accuracy, below a certain level of distortion).

d. As another example, in order to improve the memory requirements in a multi-level DMVR, it may be possible to adjust the cost (attenuate) so as to terminate the optimization.

For example, the weight may be determined appropriately by considering several block level statistics, such as block dimensions, neighboring SAD values, etc.

e. Attenuation of the cost may also be exercised between the layers, i.e., after one layer is completed and before the next layer starts.

Meanwhile, the present disclosure proposes a DMVR method using variable granularity.

In VVC, the DMVR granularity may be determined by the minimum value among luma block width and minimum subblock width (i.e., min {block luma width, minimum subblock width}), and the minimum value among luma block height and minimum subblock height (i.e., min {block luma height, minimum subblock height}), where the minimum subblock height and minimum subblock width may be 16.

Accordingly, the present disclosure proposes a method in which DMVR may be applied at several different granularities or in a non-uniform way in order to improve the performance of the inter coding structure. For this purpose, the following aspects may be considered. That is, the proposed DMVR method using variable granularity or non-uniform method may include the following embodiments, and the proposed embodiments may be applied individually or in combination.

1. As an example, it may be possible to define two variables, $Gran_x$ and $Gran_y$ to represent the granularity of the DMVR buffer to hold the refined DMVR motion vectors.

2. In addition, as an example, it may be possible to configure the DMVR granularity for the width and height on the block/subblock independently. For example, {$Gran_x$, $Gran_y$} may be calculated as $Gran_x$=$Gran_y$=min {luma width, luma height, 16}. In other words, the two variables {$Gran_x$, $Gran_y$} representing the granularity of DMVR may be determined as the minimum value among luma width, luma height, and 16. This allows the DMVR process to be performed at the smaller dimension of the block.

3. In addition, as an example, motion typically pans horizontally, therefore, it may be possible to determine the granularity by using $Gran_x$=$Gran_y$=min {luma width, 16}. In other words, for horizontally moving motion, the two variables {$Gran_x$, $Gran_y$} representing the granularity of the DMVR may be determined as the minimum value among the luma width and 16.

4. As another example, the minimum sub-CU width and height may be lowered to a smaller size, such as 8 or 4. Similarity, the minimum subblock size may be increased beyond 16 to 32, 64 and/or other appropriate value.

5. In addition, as an example, it may be possible to divide the larger block sizes into several smaller block sizes. For example, an 8×64 could be split into two 8×32 blocks instead of four 8×16 blocks. This compounded with using variable granularity as described in (item 4) above may be beneficial for use in either the current or future codec(s) as it increases flexibility without increasing complexity.

6. In addition, as an example, it may be possible to fix the granularity for the DMVR at a sequence level (i.e., through the SPS (Sequence Parameter Set)). For example, this may be the case where the DMVR SPS flag (i.e., sps_dmvr_enabled_flag) is enabled in the SPS. In other words, in SPS, if the value of sps_dmvr_enabled_flag is 1, it may be specified that DMVR is enabled. Additional flags/bits may be transmitted to indicate the granularity of the DMVR.

a. For example, a single flag may be used to indicate if a default granularity is used or if the granularity is to be derived at a lower level. From the hardware perspective, if the granularity is defined at the beginning of the sequence, then decoder may have sufficient time to set up its memory requirements and adjust for its memory usage.

b. Alternatively, if the default setting is not use, it may be possible to indicate that further controls of the DMVR granularity may be present at a lower level (e.g., a lower header) such as PPS (Picture Parameter Set), PH (Picture header), SH (Slice header), CU (Coding unit) and/or other appropriate parameter sets.

7. In addition, as an example, it may also be possible to signal the granularity information in the PPS/PH/SH/CU. Signaling at this level may be beneficial, as typically a lot more information may be signaled using context adaptive coding.

a. For example, the granularity may be signaled in every CU. That is, parameters for horizontal and vertical scale may be signaled either separately or in a combined manner.

b. It may be possible to signal an index to indicate the granularity. For example, an index of 0 (i.e., an index with a value of 0) may indicate an 8×8 grid, an index of 1 (i.e., an index with a value of 1) may indicate a 16×16 grid, an index of 2 (i.e., an index with a value of 2) may indicate 32×32 grid and so on.

c. The index may be determined by using full RD-optimization whereby, each grid granularity option may be evaluated for a cost. Alternatively, it may be possible to use faster RDO techniques which may check smaller sub-sets of granularity, which may be applied depending on sequence characteristics, such as larger resolutions like class A sequences may use 16×16 or 32×32 grid sizes while smaller sequences like class D may use 8×8 or lower sizes. Other characteristics like motion intensive sequences may check the smaller grid sizes.

8. In addition, as an example, it may be possible to context code the DMVR related parameters that may be present in PPS/PH/SH and/or CU.

a. The number of context models to be used may be determined by considering block statistics such as if DMVR was applied on the neighboring blocks, what was the average motion information of the blocks, error metrics such as SAD, mean removed SAD of the block, the number of iterations before the minimum cost point was determined, search pattern used, etc. These may be used individually or in combination to determine the number of context models.

b. Similar to item above, initialization values for the context coded elements may also be determined using similar block characteristics and/or statistics.

The following drawings have been prepared to explain specific examples of the present disclosure. The names of specific devices or specific terms/names (e.g., names of syntax/syntax elements, etc.) described in the drawings are provided as examples, and therefore the technical features of the present disclosure are not limited to the specific terms/names used in the drawings below.

Figure 7:
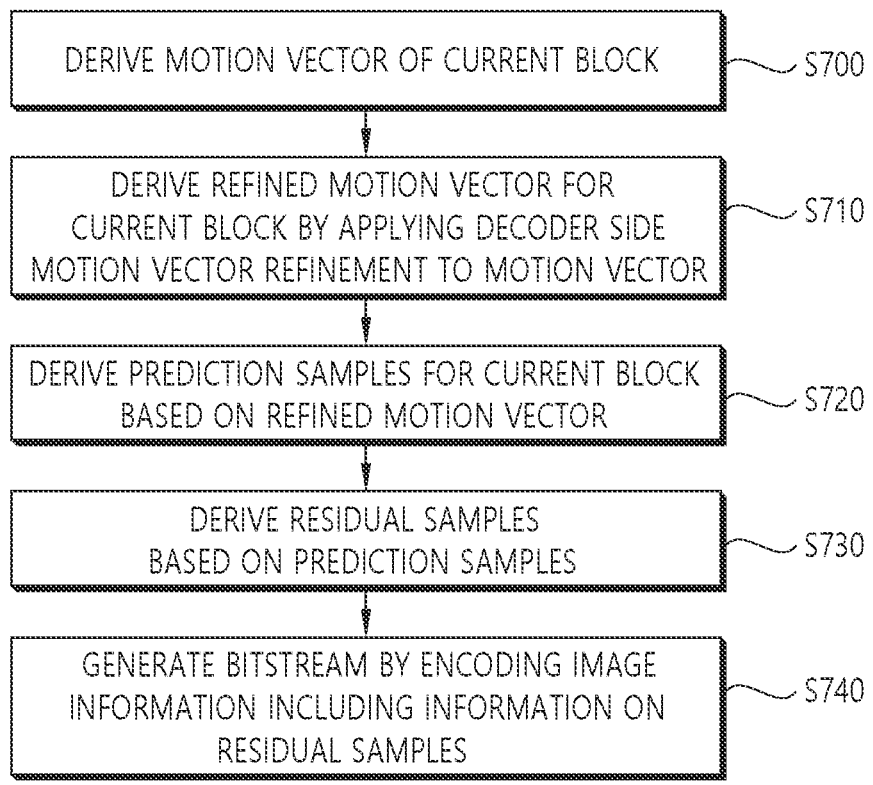
FIGS. 7 and 8 schematically show an example of a video/image encoding method and related components according to the embodiment(s) of the present disclosure.
Figure 8:
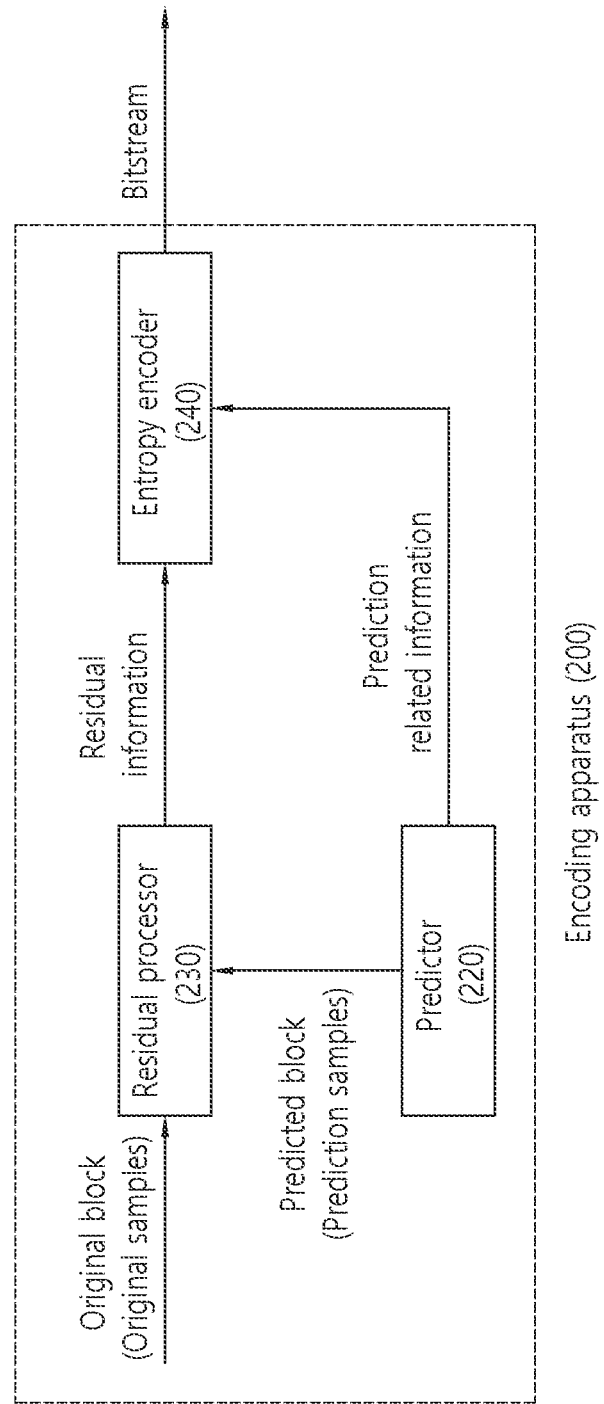

FIGS. 7 and 8 schematically show an example of a video/image encoding method and related components according to the embodiment(s) of the present disclosure.

The method disclosed in FIG. 7 may be performed by the encoding apparatus 200 disclosed in FIG. 2 or FIG. 8. Here, the encoding apparatus 200 disclosed in FIG. 8 is a simplified representation of the encoding apparatus 200 disclosed in FIG. 2. Specifically, steps S700 to S720 of FIG. 7 may be performed by the predictor 220 disclosed in FIG. 2, and step S730 of FIG. 7 may be performed by the residual processor 230 disclosed in FIG. 2, and step S740 of FIG. 7 may be performed by the entropy encoder 240 disclosed in FIG. 2. In addition, although not shown, the process of generating a reconstructed sample and a reconstructed picture for the current block based on residual sample and prediction sample for the current block is performed by the adder 250 of the encoding apparatus 200. The process of encoding prediction information for the current block may be performed by the entropy encoder 240 of the encoding apparatus 200. In addition, the method disclosed in FIG. 7 may be performed including the embodiments described above in the present disclosure. Therefore, in FIG. 7, detailed descriptions of content that overlaps with the above-described embodiments will be omitted or simplified.

Referring to FIG. 7, the encoding apparatus may derive a motion vector of a current block (S700).

In an embodiment, when performing inter prediction on the current block, the encoding apparatus may derive motion information (motion vector, reference picture index, etc.) of the current block. For example, the encoding apparatus may search for a block similar to the current block within a certain area (search area) of reference pictures through motion estimation and may derive a reference block whose difference from the current block is minimum or below a certain standard. Based on this, a reference picture index indicating the reference picture where the reference block is located may be derived, and the motion vector may be derived based on the position difference between the reference block and the current block.

In addition, the encoding apparatus may determine the inter prediction mode applied to the current block among various prediction modes. The encoding apparatus may compare the RD cost for various prediction modes and determine the optimal prediction mode for the current block.

The encoding apparatus may derive a refined motion vector for the current block by applying decoder side motion vector refinement (DMVR) to the motion vector (S710).

In an embodiment, when applying the decoder side motion vector refinement to the motion vector, the encoding apparatus may derive the refined motion vector based on the search termination condition of the decoder side motion vector refinement according to the above-described embodiments. Here, the decoder side motion vector refinement (i.e., DMVR) may include the existing DMVR or the DMVR using multiple passes (i.e., MDMVR), as described above.

For example, the search termination condition for the decoder side motion vector refinement may determine search termination based on whether the difference between the motion vector and the refined motion vector is less than a threshold (e.g., ¼ pel, half-pel, etc.). For example, if the difference between the motion vector and the refined motion vector is less than the threshold (e.g., ¼ pel, half-pel, etc.), the encoding apparatus may determine that the search termination condition is satisfied and terminate the search process (i.e., optimization process) for the decoder side motion vector refinement.

In addition, for example, the search termination condition for the decoder side motion vector refinement may determine search termination based on whether the refined motion vector is the same as the motion vector. In other words, the search termination may be determined based on whether the (refined) motion vector remains unchanged after the search process has been performed once. For example, if the refined motion vector derived after the search process is the same as the motion vector derived before the search process, the encoding apparatus may determine that the search termination condition is satisfied and terminate the search process (i.e., optimization process) for the decoder side motion vector refinement.

In addition, for example, if the decoder side motion vector refinement is DMVR using multi-pass, the search termination condition may be defined for each pass. In this case, the search termination condition for the decoder side motion vector refinement may determine search termination based on whether the refined motion vector satisfies specific criteria (e.g., pel accuracy, below a certain distortion level) after performing each pass. For example, if the refined motion vector satisfies specific criteria (e.g. pel accuracy, below a certain distortion level) after performing each pass, the encoding apparatus may determine that the search termination condition is satisfied and terminate the search process (i.e., optimization process) for the decoder side motion vector refinement.

In addition, for example, if the decoder side motion vector refinement is DMVR using multi-pass, the search termination condition for the decoder side motion vector refinement may determine search termination for each pass based on the bilateral matching cost determined based on the neighboring SAD or block dimension. The bilateral matching cost may be calculated by a weight determined based on the neighboring SAD or block dimension, and the bilateral matching cost (i.e., cost attenuation) may be adjusted for each pass.

In addition, for example, the bilateral matching cost (i.e., cost attenuation) may determine whether the search ends by checking whether the conditions are met after one pass (i.e., layer) is completed and before the next pass (i.e., layer) starts.

In addition, for example, the search termination condition for the decoder side motion vector refinement may determine search termination based on whether the Sum of Absolute Differences (SAD) derived based on the motion vector is less than the threshold or within the threshold range. Here, the threshold may be set to a specific value or may be determined empirically. For example, the threshold may be determined considering available neighboring blocks, which mode are they coded in the general luma intensity for each row/column, etc. For example, if the SAD derived based on the motion vector is within the threshold (e.g., a certain value T) or an empirically determined threshold range, the encoding apparatus may determine that the search termination condition is satisfied and terminate the search process (i.e., optimization process) for the decoder side motion vector refinement.

In addition, for example, for the current block, which is a 4×4 block or an N×M block such that N×M<=128, it may be determined whether the search termination condition for the decoder side motion vector refinement is satisfied, and the refined motion vector may be derived according to the determination.

In addition, according to the embodiment, when applying the decoder side motion vector refinement to the motion vector, the encoding apparatus may use variable granularity according to the above-described embodiments.

For example, the granularity for the decoder side motion vector refinement may be represented by defining two variables, $Gran_x$ and $Gran_y$. The two variables $Gran_x$ and $Gran_y$ may represent the granularity of the buffer for maintaining the refined motion vector.

In addition, for example, the granularity for the decoder side motion vector refinement may be determined based on block size. For example, the granularity for the width of the block (e.g., $Gran_x$) and the granularity for the height of the block (e.g., $Gran_y$) may be determined by min {block width, block height, 16}. This allows the DMVR process to be performed in a smaller dimension of the block.

In addition, for example, for motion moving horizontally, the granularity for the width of the block (e.g. $Gran_x$) and the granularity for the height of the block (e.g. $Gran_y$) may be determined by min {block width, 16}.

In addition, for example, in determining the granularity for the width of the block (e.g., $Gran_x$) and the granularity for the height of the block (e.g., $Gran_y$), the minimum sub-CU size and minimum subblock size may be used. In this case, the minimum sub-CU size may be reduced to a smaller size, such as 8 or 4, and the minimum subblock size may be increased to a size greater than 16, such as 32, 64, and/or other appropriate values. Therefore, the granularity for the decoder side motion vector refinement may be variable and applied unevenly compared to the existing method.

In addition, for example, for an 8×64 block, the granularity for the width of the block (e.g., $Gran_x$) and the granularity for the height of the block (e.g., $Gran_y$) may be determined based on division into two 8×32 blocks. This may increase flexibility without increasing complexity compared to existing methods.

In addition, for example, the granularity for the decoder side motion vector refinement may be fixed at the sequence level. For example, based on flag information, signaled in the Sequence Parameter Set (SPS), related to indicating that the decoder side motion vector refinement is enabled (e.g., when the value of sps_dmvr_enabled_flag is 1), information related to the granularity for the decoder side motion vector refinement may be signaled/obtained. In this case, the information related to the granularity for the decoder side motion vector refinement may be signaled/obtained by being included in at least one of PPS (Picture Parameter Set), PH (Picture header), SH (Slice header), or CU (Coding unit).

In addition, for example, based on the flag information, signaled in the SPS, related to indicating that the decoder side motion vector refinement is enabled (e.g., if the value of sps_dmvr_enabled_flag is 1), an additional flag indicating whether the default granularity is used or the granularity is derived from a lower level (e.g., PPS/PH/SH/CU, etc.) may be signaled/obtained. If the additional flag indicates that the information related to the granularity is present at the lower level (e.g. PPS/PH/SH/CU, etc.), the information related to the granularity may be signaled/obtained at the lower level (e.g., PPS/PH/SH/CU, etc.).

In addition, for example, the information related to the granularity for the decoder side motion vector refinement may include index information. For example, when the information related to the granularity is signaled/obtained at the lower level (e.g., PPS/PH/SH/CU, etc.), the index information for indicating the granularity may be signaled/obtained. The index information may include a first index value for indicating an 8×8 grid, a second index value for indicating a 16×16 grid, and a third index value for indicating a 32×32 grid.

In addition, for example, the information related to the granularity for the decoder side motion vector refinement may be derived based on context coding. Here, the number of context models to be used for the context coding may be determined by considering block statistics such as if DMVR was applied for the neighboring blocks, what was the average motion information of the blocks, error metrics such as SAD, mean removed SAD of the block, the number of iterations before the minimum cost point was determined, search pattern used. Additionally, initialization values for context model elements may be determined using similar block characteristics and/or statistics.

The encoding apparatus may derive prediction samples for the current block based on the refined motion vector (S720) and may derive residual samples for the current block based on the prediction samples (S730).

That is, the encoding apparatus may derive the residual samples based on the original samples for the current block and the prediction samples of the current block. And, the encoding apparatus may generate information about the residual samples. Here, the information about the residual samples may include information such as value information, position information, transform technique, transform kernel, and a quantization parameter of quantized transform coefficients derived by performing transform and quantization on the residual samples.

The encoding apparatus may encode image information (or video information) (S740). Here, the image information may include prediction-related information (e.g., prediction mode information). In addition, the image information may include the residual information. That is, the image information may include various information derived from the encoding process, and may be encoded including such various information.

In an embodiment, the encoding apparatus may generate a bitstream by encoding the image information including the information about the residual samples. In addition, the encoding apparatus may generate a bitstream by encoding the image information including the prediction-related information (e.g., prediction mode information).

The image information including various information as described above may be encoded and output in the form of the bitstream. The bitstream may be transmitted to the decoding apparatus via a network or (digital) storage medium. Here, the network may include a broadcasting network and/or a communication network, and the digital storage medium may include various storage media such as USB, SD, CD, DVD, Blu-ray, HDD, and SSD.

Figure 9:
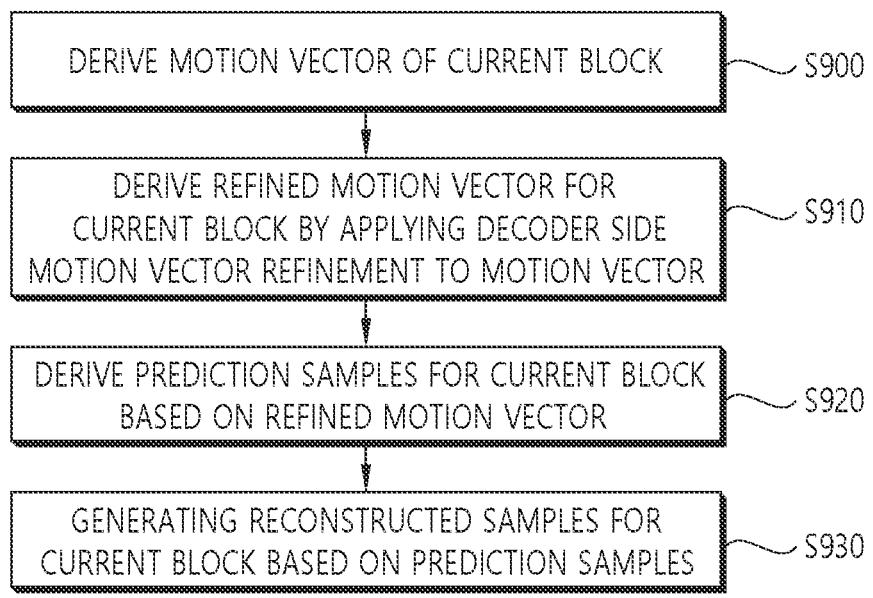
FIGS. 9 and 10 schematically show an example of a video/image decoding method and related components according to the embodiment(s) of the present disclosure.
Figure 10:
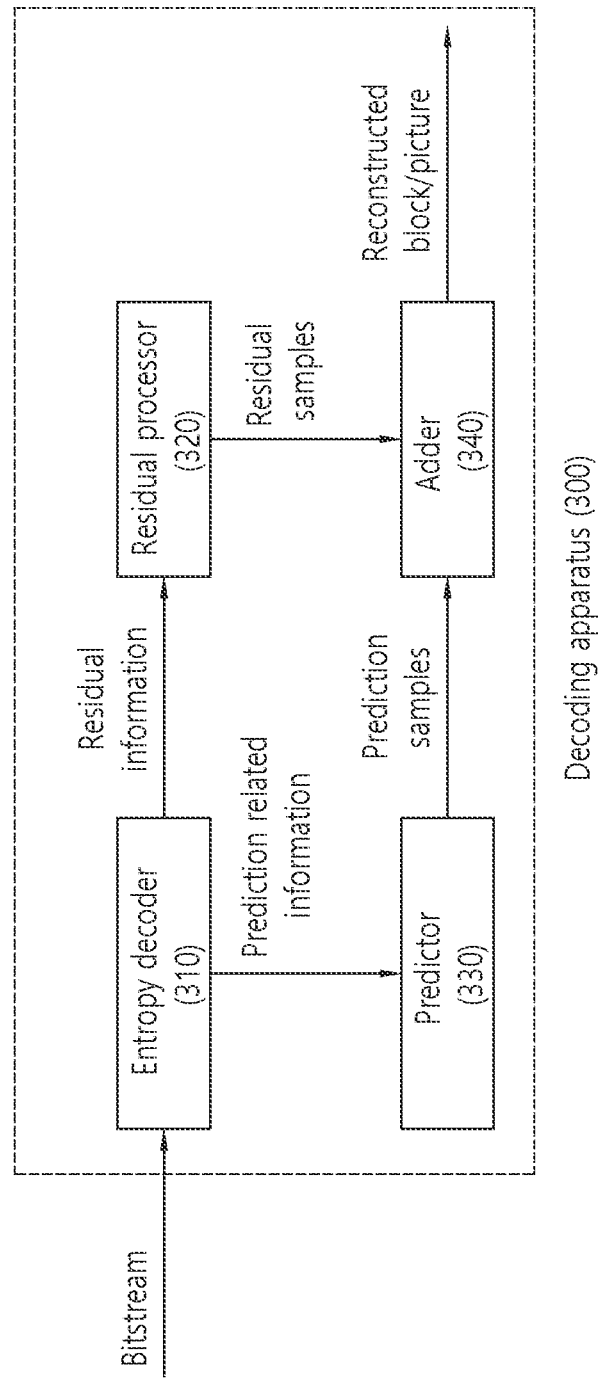

FIGS. 9 and 10 schematically show an example of a video/image decoding method and related components according to the embodiment(s) of the present disclosure.

The method disclosed in FIG. 9 may be performed by the decoding apparatus 300 disclosed in FIG. 3 or FIG. 10. Here, the decoding apparatus 300 disclosed in FIG. 10 is a simplified representation of the decoding apparatus 300 disclosed in FIG. 3. Specifically, steps S900 to S920 of FIG. 9 may be performed by the predictor 330 disclosed in FIG.

3, and step S930 of FIG. 9 may be performed by the adder 340 disclosed in FIG. 3. In addition, although not shown, the process of receiving prediction information and/or residual information for the current block may be performed by the entropy decoder 310 of the decoding apparatus 300. The process of deriving a residual sample for the current block based on residual information may be performed by the residual processor 320 of the decoding apparatus 300. In addition, the method disclosed in FIG. 9 may be performed including the embodiments described above in the present disclosure. Therefore, in FIG. 9, detailed descriptions of content that overlaps with the above-described embodiments will be omitted or simplified.

Referring to FIG. 9, the decoding apparatus may derive a motion vector of a current block (S900).

In an embodiment, the decoding apparatus may obtain image information including prediction-related information from a bitstream and determine a prediction mode for the current block based on the prediction-related information. And, the decoding apparatus may derive motion information (motion vector, reference picture index, etc.) of the current block based on the prediction mode. Here, the prediction mode may include skip mode, merge mode, (A) MVP mode, etc.

The decoding apparatus may derive a refined motion vector for the current block by applying decoder side motion vector refinement (DMVR) to the motion vector (S910).

In an embodiment, when applying the decoder side motion vector refinement to the motion vector, the decoding apparatus may derive the refined motion vector based on the search termination condition for the decoder side motion vector refinement according to the above-described embodiments. Here, the decoder side motion vector refinement (i.e., DMVR) may include the existing DMVR or the DMVR using multiple passes (i.e., MDMVR), as described above.

For example, the search termination condition for the decoder side motion vector refinement may determine search termination based on whether the difference between the motion vector and the refined motion vector is less than a threshold (e.g., ¼ pel, half-pel, etc.). For example, if the difference between the motion vector and the refined motion vector is less than the threshold (e.g., ¼ pel, half-pel, etc.), the decoding apparatus may determine that the search termination condition is satisfied and terminate the search process (i.e., optimization process) for the decoder side motion vector refinement.

In addition, for example, the search termination condition for the decoder side motion vector refinement may determine search termination based on whether the refined motion vector is the same as the motion vector. In other words, the search termination may be determined based on whether the (refined) motion vector remains unchanged after the search process has been performed once. For example, if the refined motion vector derived after the search process is the same as the motion vector derived before the search process, the decoding apparatus may determine that the search termination condition is satisfied and terminate the search process (i.e., optimization process) for the decoder side motion vector refinement.

In addition, for example, if the decoder side motion vector refinement is DMVR using multi-pass, the search termination condition may be defined for each pass. In this case, the search termination condition for the decoder side motion vector refinement may determine search termination based on whether the refined motion vector satisfies specific criteria (e.g., pel accuracy, below a certain distortion level) after performing each pass. For example, if the refined motion vector satisfies specific criteria (e.g. pel accuracy, below a certain distortion level) after performing each pass, the decoding apparatus may determine that the search termination condition is satisfied and terminate the search process (i.e., optimization process) for the decoder side motion vector refinement.

In addition, for example, if the decoder side motion vector refinement is DMVR using multi-pass, the search termination condition for the decoder side motion vector refinement may determine search termination for each pass based on the bilateral matching cost determined based on the neighboring SAD or block dimension. The bilateral matching cost may be calculated by a weight determined based on the neighboring SAD or block dimension, and the bilateral matching cost (i.e., cost attenuation) may be adjusted for each pass.

In addition, for example, the bilateral matching cost (i.e., cost attenuation) may determine whether the search ends by checking whether the conditions are met after one pass (i.e., layer) is completed and before the next pass (i.e., layer) starts.

In addition, for example, the search termination condition for the decoder side motion vector refinement may determine search termination based on whether the Sum of Absolute Differences (SAD) derived based on the motion vector is less than the threshold or within the threshold range. Here, the threshold may be set to a specific value or may be determined empirically. For example, the threshold may be determined considering available neighboring blocks, which mode are they coded in, the general luma intensity for each row/column, etc. For example, if the SAD derived based on the motion vector is within the threshold (e.g., a certain value T) or an empirically determined threshold range, the decoding apparatus may determine that the search termination condition is satisfied and terminate the search process (i.e., optimization process) for the decoder side motion vector refinement.

In addition, for example, for the current block, which is a 4×4 block or an N×M block such that N×M<=128, it may be determined whether the search termination condition for the decoder side motion vector refinement is satisfied, and the refined motion vector may be derived according to the determination.

In addition, according to the embodiment, when applying the decoder side motion vector refinement to the motion vector, the decoding apparatus may use variable granularity according to the above-described embodiments.

For example, the granularity for the decoder side motion vector refinement may be represented by defining two variables, $Gran_x$ and $Gran_y$. The two variables $Gran_x$ and $Gran_y$ may represent the granularity of the buffer for maintaining the refined motion vector.

In addition, for example, the granularity for the decoder side motion vector refinement may be determined based on block size. For example, the granularity for the width of the block (e.g., $Gran_x$) and the granularity for the height of the block (e.g., $Gran_y$) may be determined by min {block width, block height, 16}. This allows the DMVR process to be performed in a smaller dimension of the block.

In addition, for example, for motion moving horizontally, the granularity for the width of the block (e.g. $Gran_x$) and the granularity for the height of the block (e.g. $Gran_y$) may be determined by min {block width, 16}.

In addition, for example, in determining the granularity for the width of the block (e.g., $Gran_x$) and the granularity for the height of the block (e.g., $Gran_y$), the minimum sub-CU size and minimum subblock size may be used. In this case, the minimum sub-CU size may be reduced to a smaller size, such as 8 or 4, and the minimum subblock size may be increased to a size greater than 16, such as 32, 64, and/or other appropriate values. Therefore, the granularity for the decoder side motion vector refinement may be variable and applied unevenly compared to the existing method.

In addition, for example, for an 8×64 block, the granularity for the width of the block (e.g., $Gran_x$) and the granularity for the height of the block (e.g., $Gran_y$) may be determined based on division into two 8×32 blocks. This may increase flexibility without increasing complexity compared to existing methods.

In addition, for example, the granularity for the decoder side motion vector refinement may be fixed at the sequence level. For example, based on flag information, signaled in the Sequence Parameter Set (SPS), related to indicating that the decoder side motion vector refinement is enabled (e.g., when the value of sps_dmvr_enabled_flag is 1), information related to the granularity for the decoder side motion vector refinement may be signaled/obtained. In this case, the information related to the granularity for the decoder side motion vector refinement may be signaled/obtained by being included in at least one of PPS (Picture Parameter Set), PH (Picture header), SH (Slice header), or CU (Coding unit).

In addition, for example, based on the flag information, signaled in the SPS, related to indicating that the decoder side motion vector refinement is enabled (e.g., if the value of sps_dmvr_enabled_flag is 1), an additional flag indicating whether the default granularity is used or the granularity is derived from a lower level (e.g., PPS/PH/SH/CU, etc.) may be signaled/obtained. If the additional flag indicates that the information related to the granularity is present at the lower level (e.g. PPS/PH/SH/CU, etc.), the information related to the granularity may be signaled/obtained at the lower level (e.g., PPS/PH/SH/CU, etc.).

In addition, for example, the information related to the granularity for the decoder side motion vector refinement may include index information. For example, when the information related to the granularity is signaled/obtained at the lower level (e.g., PPS/PH/SH/CU, etc.), the index information for indicating the granularity may be signaled/obtained. The index information may include a first index value for indicating an 8×8 grid, a second index value for indicating a 16×16 grid, and a third index value for indicating a 32×32 grid.

In addition, for example, the information related to the granularity for the decoder side motion vector refinement may be derived based on context coding. Here, the number of context models to be used for the context coding may be determined by considering block statistics such as if DMVR was applied for the neighboring blocks, what was the average motion information of the blocks, error metrics such as SAD, mean removed SAD of the block, the number of iterations before the minimum cost point was determined, search pattern used. Additionally, initialization values for context model elements may be determined using similar block characteristics and/or statistics.

The decoding apparatus may derive prediction samples for the current block based on the refined motion vector (S920) and may generate reconstructed samples for the current block based on the prediction samples (S930).

In an embodiment, the decoding apparatus may directly use prediction samples as the reconstructed samples depending on the prediction mode, or may generate the reconstructed samples by adding the residual samples to the prediction samples.

If the residual sample for the current block exists, the decoding apparatus may receive information about the residual for the current block. The information about the residual may include transformation coefficients about the residual samples. The decoding apparatus may derive the residual samples (or residual sample array) for the current block based on the residual information. Specifically, the decoding apparatus may derive quantized transform coefficients based on the residual information. The quantized transform coefficients may have a one-dimensional vector form based on the coefficient scan order. The decoding apparatus may derive transform coefficients based on a dequantization process for the quantized transform coefficients. The decoding apparatus may derive the residual samples based on the transform coefficients.

The decoding apparatus may generate the reconstructed samples based on the prediction samples and the residual samples, and may derive a reconstructed block or reconstructed picture based on the reconstructed samples. Specifically, the decoding apparatus may generate the reconstructed samples based on the sum between the prediction samples and the residual samples. Thereafter, as described above, the decoding apparatus may apply an in-loop filtering procedure, such as deblocking filtering and/or SAO procedure, to the reconstructed picture in order to improve subjective/objective picture quality, if necessary.

In the above-described embodiment, the methods are described based on the flowchart having a series of steps or blocks. The embodiments of the present disclosure are not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The above-described method according to the embodiments of the present disclosure may be implemented in the form of software, and the encoding apparatus and/or decoding apparatus according to the present disclosure may be included in devices that perform image processing, such as a TV, computer, smartphone, set-top box, display device.

When the embodiments in the present disclosure are implemented as software, the above-described method may be implemented as a module (process, function, etc.) that performs the above-described functions. The module may be stored in memory and executed by a processor. The memory may be internal or external to the processor, and may be coupled with the processor in a variety of well-known means. The processor may include an application-specific integrated circuit (ASIC), other chipsets, logic circuits, and/or data processing devices. The memory may include read-only memory (ROM), random access memory (RAM), flash memory, memory cards, storage media, and/or other storage devices. That is, the embodiments described in the present disclosure may be implemented and performed on a processor, microprocessor, controller, or chip. For example, functional units shown in each drawing may be implemented and performed on a computer, processor, microprocessor, controller, or chip. In this case, information for implementation (e.g., information on instructions) or an algorithm may be stored in a digital storage medium.

In addition, the decoding apparatus and the encoding apparatus to which the embodiment(s) of the present disclosure are applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a virtual reality (VR) apparatus, an augmented reality (AR) apparatus, a teleconference video apparatus, a transportation user equipment (e.g., vehicle (including autonomous vehicles) user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the embodiment(s) of the present disclosure is applied may be produced in the form of a program that is to be executed by a computer and may be stored in a computer-readable recording medium. Multimedia data having a data structure according to the embodiment(s) of the present disclosure may also be stored in computer-readable recording media. The computer-readable recording media include all types of storage devices and distributed storage devices in which data readable by a computer system is stored. The computer-readable recording media may include, for example, a Blu-ray Disk (BD), a Universal Serial Bus (USB), ROM, PROM, EPROM, EEPROM, RAM, CD-ROM, a magnetic tape, a floppy disk, and an optical data storage device. Furthermore, the computer-readable recording media includes media implemented in the form of carrier waves (e.g., transmission through the Internet). In addition, a bitstream generated by the encoding method may be stored in a computer-readable recording medium or may be transmitted over wired/wireless communication networks.

In addition, the embodiment(s) of the present disclosure may be implemented with a computer program product according to program codes, and the program codes may be performed in a computer by the embodiment(s) of the present disclosure. The program codes may be stored on a carrier which is readable by a computer.

Figure 11:
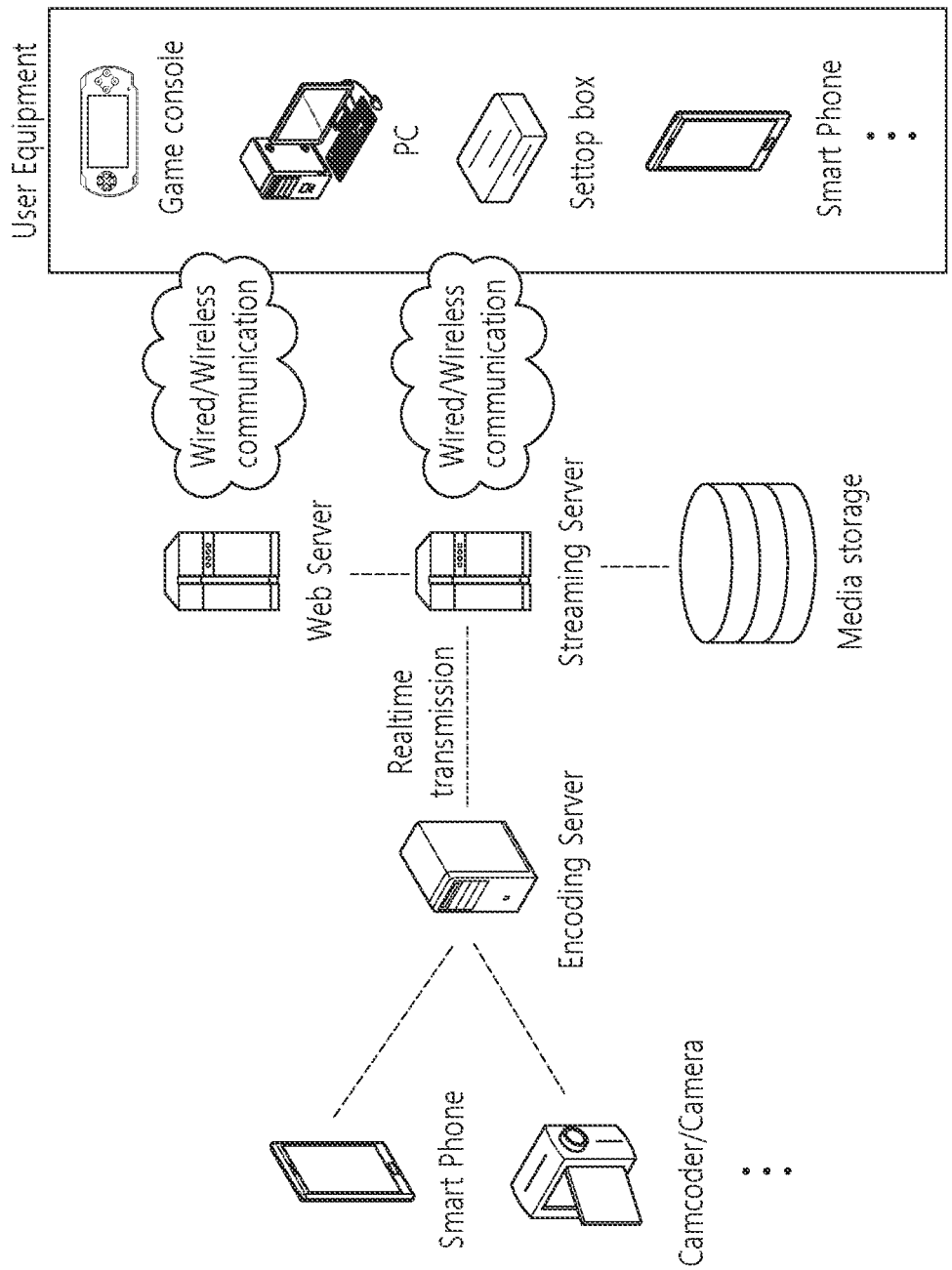
FIG. 11 illustrates an example of a content streaming system to which embodiments disclosed in the present disclosure may be applied.

FIG. 11 illustrates an example of a content streaming system to which embodiments disclosed in the present disclosure may be applied.

Referring to FIG. 11, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., Smartwatches, smart glasses, head mounted displays), digital TVs, desktops computer, digital signage, and the like.

Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the method comprising:
    deriving a motion vector of a current block;
    deriving a refined motion vector for the current block by applying decoder side motion vector refinement (DMVR) to the motion vector;
    deriving prediction samples for the current block based on the refined motion vector; and
    generating reconstructed samples for the current block based on the prediction samples,
    wherein the refined motion vector is derived based on a search termination condition for the decoder side motion vector refinement,
    wherein a granularity for the decoder side motion vector refinement is determined based on a block size, and
    wherein the granularity for a block width and the granularity for a block height are determined by min {block width, block height, 16}.

2. The image decoding method of claim 1, wherein the search termination condition determines search termination based on whether a difference between the motion vector and the refined motion vector is less than a threshold.

3. The image decoding method of claim 1, wherein the search termination condition determines search termination based on whether the refined motion vector is the same as the motion vector.

4. The image decoding method of claim 1, wherein when the decoder side motion vector refinement is a DMVR using multi-pass, the search termination condition is defined for each pass, and wherein the search termination condition determines search termination based on whether the refined motion vector satisfies a specific criterion after performing each pass.

5. The image decoding method of claim 1, wherein when the decoder side motion vector refinement is DMVR using multi-pass, the search termination condition determines search termination for each pass based on a bilateral matching cost determined based on a neighboring Sum of Absolute Differences (SAD) or block dimension.

6. The image decoding method of claim 1, wherein the search termination condition determines search termination based on whether a Sum of Absolute Differences (SAD) derived based on the motion vector is less than a threshold or within a threshold range.

7. The image decoding method of claim 1, wherein for the current block which is a 4×4 block or an N×M block with N×M<=128, the refined motion vector is derived based on the search termination condition for the decoder side motion vector refinement.

8. The image decoding method of claim 1, wherein for horizontal motion, the granularity of the block width and the granularity of the block height are determined by min {block width, 16}, or
wherein for an 8×64 block, the granularity for the block width and the granularity for the block height are determined based on division into two 8×32 blocks.

9. The image decoding method of claim 1, wherein based on flag information, signaled in a Sequence Parameter Set (SPS), related to indicating that the decoder side motion vector refinement is enabled, information related to the granularity for the decoder side motion vector refinement is obtained, and
wherein the information related to the granularity for the decoder side motion vector refinement is included in at least one of Picture Parameter Set (PPS), Picture header (PH), Slice header (SH), or Coding unit (CU).

10. The image decoding method of claim 9, wherein the information related to the granularity for the decoder side motion vector refinement includes index information, and
wherein the index information includes a first index value for indicating an 8×8 grid, a second index value for indicating a 16×16 grid, and a third index value for indicating a 32×32 grid.

11. The image decoding method of claim 9, wherein the information related to the granularity for the decoder side motion vector refinement is derived based on context coding.

12. An image encoding method performed by an encoding apparatus, the method comprising:
deriving a motion vector of a current block;
deriving a refined motion vector for the current block by applying decoder side motion vector refinement (DMVR) to the motion vector;
deriving prediction samples for the current block based on the refined motion vector;
deriving residual samples based on the prediction samples; and
generating a bitstream by encoding image information including information on the residual samples,
wherein the refined motion vector is derived based on a search termination condition for the decoder side motion vector refinement,
wherein a granularity for the decoder side motion vector refinement is determined based on a block size, and
wherein the granularity for a block width and the granularity for a block height are determined by min {block width, block height, 16}.

13. A non-transitory computer-readable digital storage medium storing a bitstream generated by the image encoding method of claim 12.

14. A transmission method of data comprising a bitstream of image information, the transmission method comprising:
obtaining the bitstream of the image information, wherein the bitstream is generated based on deriving a motion vector of a current block, deriving a refined motion vector for the current block by applying decoder side motion vector refinement (DMVR) to the motion vector, deriving prediction samples for the current block based on the refined motion vector, deriving residual samples based on the prediction samples, encoding image information including information on the residual samples; and
transmitting the data comprising the bitstream,
wherein the refined motion vector is derived based on a search termination condition for the decoder side motion vector refinement,
wherein a granularity for the decoder side motion vector refinement is determined based on a block size, and
wherein the granularity for a block width and the granularity for a block height are determined by min {block width, block height, 16}.

* * * * *